United States Patent Office 2,933,462
Patented Apr. 19, 1960

2,933,462
METHOD FOR THE PREPARATION OF FOAMED POLYURETHANES

James Rodney Fischer, Monrovia, Calif., assignor to Aerojet-General Corporation, Azusa, Calif., a corporation of Ohio No Drawing. Application July 3, 1957
Serial No. 670,843

11 Claims. (Cl. 260—2.5)

This invention relates to an improved catalyst for use in the preparation of foamed polyurethane plastic. In particular, the invention relates to such a catalyst which is a chelate having the general formula:

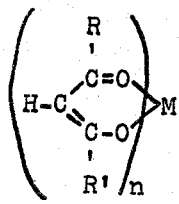

wherein R and R' are monovalent organic radicals, M is a metal radical having a coordination number equal to twice its electro-valence, and $n$ is an integer which corresponds to the electro-valence of M.

Foamed polyurethanes are prepared by reacting organic compounds having as their sole reacting groups isocyanate groups, other organic compounds having as their sole reacting groups hydroxyl groups, and a small amount of water. The isocyanate containing compounds react with the hydroxyl containing compounds and thus form polymers in accordance with the general reaction scheme set forth below:

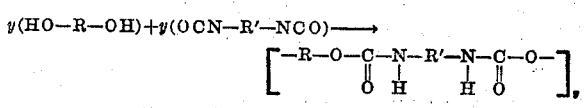

wherein R and R' are divalent organic radicals which may be the same or different, and $y$ is the number of repeating units in the polymer chain. When nitropolyurethanes are prepared according to the above reaction scheme, either the isocyanate monomers, the hydroxy containing monomers, or both may contain nitro groups.

The water which is present reacts with the (—NCO) groups on the isocyanate compounds, thus releasing $CO_2$. The released $CO_2$ forms bubbles in the polymerized mass, thus imparting a cellular or foamed structure thereto.

Heretofore the polyurethane reaction for the production of foamed polyurethanes has been carried out in the presence of various reaction rate catalysts, such as, for example, hexahydrodimethyl aniline, diethylethanolamine, N-methyl morpholine, etc. Although these catalysts have been satisfactory to a certain extent, I have found that the chelate materials within the scope of the present invention offer advantages over these materials as polyurethane catalysts. My chelate catalyst can be used in much smaller quantities than the previously known catalysts. For example, they are effective when present in quantities equal to only ten percent of the quantities of the catalysts heretofore known.

My novel chelate catalysts are more effective than previously known polyurethane catalysts in that they effect a faster rate of polymerization when present in lower concentration. Also, they effect a more complete reaction and thus more product can be produced from the same quantities of starting materials. Moreover, since lower quantities of the chelates (than of the known catalysts) can be employed, there is less residual catalyst in the final polyurethane product which makes for improved aging properties in the polymerization mass.

The chelates which are useful as polyurethane catalysts, as taught herein, are non-polar compounds. I have found that the preferred chelate for my purpose is ferric acetylacetonate, but there are also a great number of other chelates within the scope of my invention.

The following examples are included for the purpose of more clearly illustrating my invention. These examples are intended for illustrative purposes only and are not to be construed as limiting the invention to the particular conditions set forth therein.

Example I

This is an example of the preparation of a flexible, light density polyurethane foam using a chelate within the scope of my invention as a catalyst.

The following ingredients, in the amounts specified, are mixed rapidly by mechanical means:

Ingredients: Parts by weight
Polyester prepared from adipic acid, diethylene glycol and trimethylol propane in the molar ratio of 1.0/1.0/0.05, having an acid number of about 1.0 and a hydroxyl number of about 60_____ 100
Mixed isomers of tolylene diisocyanate in the ratio of 70/30 of 2,4/2,6 isomers_____ 48
Ferric acetylacetonate_____ 0.3
Diethylamine oleate_____ 1.0
Turkey red oil (sulfonated castor oil) as a 50% aqueous solution _____ 3.0
Water _____ 2.0
Mineral oil_____ 0.5

As a result of the rapid mixing of the above ingredients, a polyurethane foam which is flexible and of low density is formed. The final foam has a density of from two to three pounds per cubic foot, this relatively low value being due to the highly cellular or foamed nature of the material.

Although polymerization of the principal ingredients starts immediately upon mixing of the polyester, diisocyanate and catalyst, the mixture is aged until the reaction is substantially complete.

The ferric acetylacetonate is present as the polymerization rate catalyst in about one-tenth of the amount required of a conventional catalytic material such as diethyl ethanolamine.

The Turkey red oil is present as a wetting agent and the diethylamine oleate as an auxiliary wetting agent which acts as an anti-shrinking agent in the foamed mass.

The water in the mixture performs two functions. It releases $CO_2$, which gives the mass its foamed structure, by reaction with the isocyanate, and it results in the simultaneous formation of substituted urea which thereafter serves as a crosslinking agent by reaction with the linear polymers in the mixture. The substituted urea is another product of the $CO_2$ producing reaction of the water and the isocyanate.

The mineral oil is an agent which has the effect of helping to regulate the sizes of the pores formed in the mass by the gaseous $CO_2$.

Example II

This is an example of the preparation of a relatively rigid polyurethane foam having a density greater than that of the Example I product.

The following ingredients are mixed simultaneously by mechanical means:

| Ingredient: | Parts by weight |
|---|---|
| Polyester prepared from adipic acid, phthalic acid and trimethylol propane in a molar ratio of 2.5/0.5/4.0 | 50 |
| Polyester prepared from adipic acid, 1,4-butylene glycol and trimethylol propane in a molar ratio of 3.0/3.0/1.0 | 50 |
| Finely divided CaCO$_3$ | 10 |
| Tolylene diisocyanate | 75 |
| Vanadyl acetylacetonate | 0.2 |
| 50% aqueous solution of sulfonated castor oil | 4 |
| Diethylamine oleate | 2 |

After the above ingredients are mixed, they are allowed to age for substantial completion of the polymerization. Here again, as in Example I, the polyester reacts with the diisocyanate present to form a polyurethane, but in this case the polyester consists of a mixture of two individual polyester components, as tabulated above. The finely divided CaCO$_3$ is present merely as an inert filler. The vanadyl acetylacetonate is the chelate catalyst. The sulfonated castor oil and the diethylamine oleate are present as wetting agents, the latter also functioning as an anti-shrinking agent. The water present in the sulfonated castor oil solution reacts with the diisocyanate to produce the foam forming CO$_2$.

The polyurethane foam of this example is a relatively heavy and rigid material having a density of about 4.5 pounds per cubic foot.

*Example III*

This example is similar to Example I, with respect to the ingredients, but the method of formulation differs therefrom. In Example I, all of the ingredients were mixed simultaneously and the resulting mixture was then aged. In the present example, the polyester and diisocyanate components are premixed and permitted to react at room temperature to form a so-called "prepol" or adduct which consists, for the most part, of a material averaging two molecules of diisocyanate to each molecule of linear polyester. The effect of this premixing and reaction at room temperature is to convert the originally present hydroxyl-terminated diol to an isocyanate-terminated polyester containing some free diisocyanate. During this premixing operation all moisture is rigidly excluded.

The ingredients of Example I, other than the polyester and diisocyanate, are thoroughly mixed to form an emulsion, and the emulsion is then mixed with the diisocyanate-polyester adduct in the ratio of 6.8 parts by weight of the resulting mixture to 148 parts by weight of the diisocyanate-polyester adduct.

The procedure of this example produces a flexible polyurethane foam of about the same density as that produced in Example I, that is, between about two and about three pounds per cubic foot.

*Example IV*

This example is similar to Example III, the only difference being that a different chelate catalyst is employed.

The procedure of Example III is followed except that bis(dibenzoylmethane)Cu(II) is used as the catalyst instead of ferric acetylacetonate.

The final product is a flexible polyurethane foam having a density of about two pounds per cubic foot.

*Example V*

This is an example of another method of formulating the polyurethane of Example I in which a premixing operation is performed. The polyester of Example I, in the amount disclosed therein, is premixed with a mixture of all of the other ingredients except the diisocyanate components. This mixture, which comprises 100 parts by weight of the polyester and 6.8 parts by weight of other ingredients, is stable and can be stored for long periods of time if desired.

To prepare the final foamed polyurethane, 48 parts by weight of the diisocyanate isomers of Example I are mixed thoroughly with the mixture described above. After aging, the foamed polyurethane is a relatively light weight material of about the same density, and possessed of substantially the same physical properties, as the polyurethane foam of Example I.

*Example VI*

This example is similar to Example V, the only difference being that a different chelate catalyst is employed.

The procedure of Example V is followed, except that bis(ethyl acetoacetate)Cu(II) is used as the catalyst instead of ferric acetylacetonate.

The final product is a flexible polyurethane foam having a density of about two pounds per cubic foot.

It is evident from the reaction scheme set forth hereinbefore that the polymerization of a wide variety of isocyanate and hydroxy compounds to polyurethanes can be catalyzed with the chelate catalysts of the present invention. The isocyanate compounds are preferably diisocyanates such as, for example, those disclosed in U.S. Patent No. 2,577,279, issued December 4, 1951. The hydroxy compound can be any compound capable of reacting with an isocyanate to form a polyurethane such as, for example, a long chain diol. The long chain diol may be a hydroxyl terminated polyester, a polyether such as polybutylene glycol or polypropylene glycol, or any other suitable organic compound containing reactive hydroxyl groups. The polyurethane reaction is so well known to those skilled in the art that further discussion at this point is considered unnecessary.

The chelate polyurethane catalysts of this invention can be used for the preparation of nitropolyurethanes such as those described in my copending United States patent application Serial No. 422,649, filed April 12, 1954, and now abandoned. These nitropolyurethanes are useful as smokeless propellants. For example, ferric acetylacetonate can be used as a catalyst in the preparation of foamed polyurethane having the general formula:

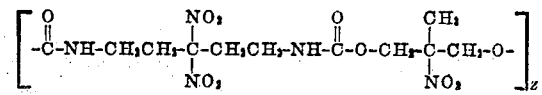

wherein Z is a whole number, from 2-nitro-2-methyl-1,3-propanediol and 3,3-dinitro-1,5-pentane diisocyanate by polymerizing these two compounds in its presence.

The chelate catalysts of this invention are those conforming to the general formula given previously, in which the R and R' are monovalent organic radicals which are substantially unreactive with any of the other ingredients present in the polymerization mass. The metal radical, M, can be any metal having a coordination number equal to twice its electrovalence which forms a stable non-polar chelate of the type shown in the general formula. The preferred catalyst is ferric acetylacetonate in which both R and R' are methyl groups. R and R' are not limited to alkyl groups, however, since any other organic radicals which are substantially unreactive with the monomers or other ingredients present in the polymerization mass will suffice for my purpose. For example, the radicals R and R' can be aromatic, such as those in the chelate bis(dibenzoylmethane)Cu(II) in which they are phenyl groups. R and R' do not have to be identical; there are many chelates within the scope of my invention in which they differ. For example bis(ethyl acetoacetate)Cu(II), in which R is a methyl group and R' is an alkoxy group, is a suitable catalyst within the scope of my invention. There are many metal chelates suitable as polymerization rate catalysts for the polyurethane reaction such as, for example, vanadyl acetylacetonate, chromium acetylacetonate, beryllium acetylacetonate, cerrous acetylacetonate, zirconium acetylacetonate, aluminum acetylacetonate, and many others.

The chelate catalysts of this invention can be used in quantities within the range from mere traces up to amounts equivalent to about one percent by weight of the total mass, and even higher.

The polyurethane polymerization reaction can be effectively carried out at any temperature, the only effect of temperature variation being a corresponding change in the rate of reaction. The polymerization can be effected at room temperature, although higher temperatures increase the rate and might be desirable in certain cases; however, the polymerization will take place at temperatures much below room temperature, and thus temperature is not a critical variable.

As previously explained, a relatively small amount of water is employed in the preparation of polyurethane foams. It is evident that the more water is used, the more $CO_2$ is produced, and thus the lighter will be the final polyurethane foam. Consequently, depending on the nature of foam required, an amount of water within the range from about 0.1 to about 6.0 percent by weight, based on the weight of the polyester or other hydroxyl component, is usually employed. The preferred amount of water for the production of flexible polyurethane foams of relatively low density is from about 2.8 to about 4.0 percent by weight, based on the weight of the hydroxyl-containing component. Various ingredients in addition to the isocyanate, hydroxyl compound, and chelate catalyst can be employed within the scope of my invention. For example, inert fillers such as finely divided calcium carbonate or silica, wetting agents, and additives for various other purposes can be employed. All of these minor ingredients for regulating the properties of the mix or of the final polyurethane foam are well known to those skilled in the art and need not be further discussed.

The method of mixing or formulating the various ingredients comprising the polyurethane mixtures catalyzed by my novel improved catalyst is not critical. Thus, any means of accomplishing intimate admixture of the ingredients whereby polyurethane foams are formed is satisfactory.

As previously disclosed, a great variety of isocyanates can be polymerized with a great variety of hydroxy containing compounds in the presence of my new chelate catalyst, and thus obtain the benefit in rate of polymerization attributable to the catalyst. For example, polymethylene diisocyanates such as ethylene diisocyanate, trimethylene diisocyanate, tetramethylene diisocyanate, hexamethylene diisocyanate, decamethylene diisocyanate, etc.; alkylene diisocyanates such as butylene-1,3-diisocyanate; alkylidene diisocyanates such as ethylidene diisocyanate; cycloalkylene diisocyanates such as cyclopentylene-1,3-diisocyanate, cyclohexylene-1,3-diisocyanate, cyclohexylene-1,4-diisocyanate, etc.; cycloalkylidene diisocyanates such as cyclopentylidene diisocyanate, cyclohexylidene diisocyanate, etc.; aromatic diisocyanates such as o-phenylene diisocyanate, p-phenylene diisocyanate, 1-methyl-2,4-phenylene diisocyanate, naphthylene-1,4-diisocyanate, diphenylene-4,4'-diisocyanate, etc.; or aliphatic-aromatic diisocyanates such as xylylene-1,4-diisocyanate, xylylene-1,3-diisocyanate, 4,4'-diphenylenemethane diisocyanate, 4,4'-diphenylenepropane diisocyanate, etc. polymerize with hydroxyl containing compounds containing a plurality of either phenolic or alcoholic hydroxyl radicals having the general formula, HOROH, where R is polymethylene, alkylene, cycloalkylene, aromatic or aromatic-aliphatic. For example, the compounds formed by replacing the isocyanate groups of the isocyanate compounds listed above with hydroxyl groups would be equally suitable for reacting with isocyanates to form polyurethanes within the scope of this invention. Examples of some polyhydroxy compounds suitable for the polyurethane polymerization reaction are 2,2-di(4-hydroxyphenyl)propane, 2,2-dimethyl-1,3-propane diol, cyclohexanediol-1,4, ethylene glycol, tetramethylene glycol, hexamethylene glycol, octamethylene glycol, decamethylene glycol, triethylene glycol, di($\beta$-hydroxyethyl)ether, resorcinol, p,p'-dihydroxydiphenyl, glycerol, sorbitol, hexamethylenebis(glycolamide), N-phenyl diethanolamine, etc.

It is well known to those skilled in the art that isothiocyanates and polythiol compounds react to produce polyurethanes in a manner similar to the polymerization of isocyanates and polyol compounds. For example, isothiocyanates such as butylene-1,3-diisothiocyanate, ethylidene diisothiocyanate, cyclohexylene-1,2-diisothiocyanate, cyclohexylidene diisothiocyanate, p-phenylene diisothiocyanate, and xylylene-1,4-diisothiocyanate, etc., react, in the presence of my new chelate catalyst, with polythiol compounds such as decamethylene dithiol, 1,2,3-trithiolpropane, 1,2,3-trithiolisobutane, thiolresorcinol, ethylene bis(thiol glycolate) etc. to yield corresponding polyurethane compounds.

Chelate compounds suitable as polyurethane polymerization catalysts within the scope of this invention can be prepared from metals in the form in which their coordination numbers are equal to twice their electrovalences, respectively. For example, such chelate compounds can be prepared from copper, beryllium, magnesium, strontium, zinc, mercury, aluminum, indium, lanthanum, cerium, praseodymium, neodymium, samarium, zirconium, chromium, molybdenum, uranium, manganese, iron cobalt, nickel, platinum, palladium, cesium, cadmium, scandium, thorium, vanadium, gallium, thallium, yttrium, europium, gadolinium, hafnium, lead and plutonium.

I claim:

1. The method of preparing a foamed polyurethane composition comprising reacting an organic compound having, as its sole reacting groups, a plurality of isocyanate groups with an organic compound having, as its sole reacting groups, a plurality of hydroxyl groups, and water, in the presence of a chelate having the general formula:

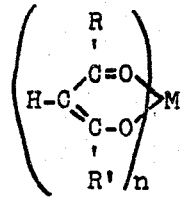

wherein R and R' are unreactive monovalent organic radicals, M is a metal radical having a coordination number equal to twice its electrovalence, and $n$ is an integer which corresponds to the electrovalence of M.

2. The method of preparing a foamed polyurethane composition comprising reacting an organic compound having, as its sole reacting groups, a plurality of isocyanate groups with an organic compound having, as its sole reacting groups, a plurality of hydroxyl groups, and water, the water being present in an amount within the range from about 0.1 to about 6.0 percent by weight of the weight of the hydroxyl containing compound, in the presence of a chelate having the general formula:

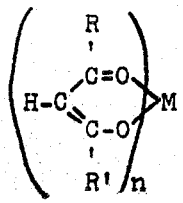

wherein R and R' are unreactive monovalent organic radicals, M is a metal radical having a coordination number equal to twice its electrovalence, and n is an integer which corresponds to the electrovalence of M.

3. The method of preparing a foamed polyurethane composition comprising reacting an organic compound having, as its sole reacting groups, a plurality of isocyanate groups with an organic compound having, as its sole reacting groups, a plurality of hydroxyl groups, and water, the water being present in an amount within the range from about 0.1 to about 6.0 percent by weight of the weight of the hydroxyl containing compound, in the presence of a chelate having the general formula:

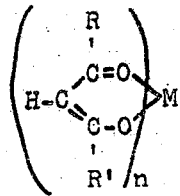

wherein R and R' are unreactive monovalent organic radicals, M is a metal radical having a coordination number equal to twice its electrovalence, and n is an integer which corresponds to the electrovalence of M, said chelate being present in an amount not greater than about 1 percent by weight of the total mass.

4. The method of preparing a foamed polyurethane composition comprising reacting an organic compound having, as its sole reacting groups, a plurality of isocyanate groups with an organic compound having, as its sole reacting groups, a plurality of hydroxyl groups, and water, the water being present in an amount within the range from about 0.1 to about 6.0 percent by weight of the weight of the hydroxyl containing compound, in the presence of a chelate having the general formula:

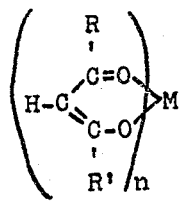

wherein R and R' are aliphatic radicals, M is a metal radical having a coordination number equal to twice its electrovalence and n is an integer which corresponds to the electrovalence of M, said chelate being present in an amount not greater than about 1 percent by weight of the total mass.

5. The method of preparing a foamed polyurethane composition comprising reacting an organic compound having, as its sole reacting groups, a plurality of isocyanate groups with an organic compound having, as its sole reacting groups, a plurality of hydroxyl groups, and water, the water being present in an amount within the range from about 0.1 to about 6.0 percent by weight of the weight of the hydroxyl containing compound, in the presence of a chelate having the general formula:

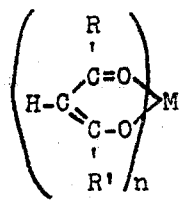

wherein R and R' are aromatic radicals, M is a metal radical having a coordination number equal to twice its electrovalence and n is an integer which corresponds to the electrovalence of M, said chelate being present in an amount not greater than about 1 percent by weight of the total mass.

6. The method of preparing a foamed polyurethane composition comprising reacting an organic compound having, as its sole reacting groups, a plurality of isocyanate groups with an organic compound having, as its sole reacting groups, a plurality of hydroxyl groups, and water, the water being present in an amount within the range from about 0.1 to about 6.0 percent by weight of the weight of the hydroxyl containing compound, in the presence of a chelate having the general formula:

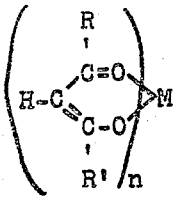

wherein R and R' are alkyl radicals, M is a metal radical having a coordination number equal to twice its electrovalence and n is an integer which corresponds to the electrovalence of M, said chelate being present in an amount not greater than about 1 percent by weight of the total mass.

7. The method of preparing a foamed polyurethane composition comprising reacting an organic compound having, as its sole reacting groups, a plurality of isocyanate groups with an organic compound having, as its sole reacting groups, a plurality of hydroxyl groups, and water, the water being present in an amount within the range from about 0.1 to about 6.0 percent by weight of the weight of the hydroxyl containing compound, in the presence of ferric acetylacetonate in an amount not greater than about 1 percent by weight of the total mass.

8. The method of preparing a foamed polyurethane composition comprising reacting an organic compound having, as its sole reacting groups, a plurality of isocyanate groups with an organic compound having, as its sole reacting groups, a plurality of hydroxyl groups, and water, the water being present in an amount within the range from about 0.1 to about 6.0 percent by weight of the weight of the hydroxyl containing compound, in the presence of vanadyl acetylacetonate in an amount not greater than about 1 percent by weight of the total mass.

9. The method of preparing a foamed polyurethane composition comprising reacting an organic compound having, as its sole reacting groups, a plurality of isocyanate groups with an organic compound having, as its sole reacting groups, a plurality of hydroxyl groups, and water, the water being present in an amount within the range from about 0.1 to about 6.0 percent by weight of the weight of the hydroxyl containing compound, in the presence of bis (dibenzoylmethane) Cu(II) in an amount not greater than about 1 percent by weight of the total mass.

10. The method of preparing a foamed polyurethane composition comprising reacting an organic compound having, as its sole reacting groups, a plurality of isocyanate groups with an organic compound having, as its sole reacting groups, a plurality of hydroxyl groups, and water, the water being present in an amount within the range from about 0.1 to about 6.0 percent by weight of the weight of the hydroxyl containing compound, in the presence of bis (ethyl acetoacetate) Cu(II) in an amount not greater than about 1 percent by weight of the total mass.

11. The method of preparaing a foamed polyurethane composition comprising reacting an organic compound having, as its sole reacting groups, a plurality of isocyanate groups with an organic compound having, as its sole reacting groups, a plurality of thiol groups, and water, the water being present in an amount within the range from about 0.1 to about 6.0 percent by weight of the weight of the thiol containing compound, in the presence of a chelate having the general formula:

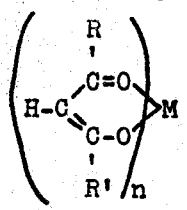

wherein R and R' are unreactive monovalent organic radicals, M is a metal radical having a coordination number equal to twice its electrovalence, and $n$ is an integer which corresponds to the electrovalence of M, said chelate being present in an amount not greater than about 1 percent by weight of the total mass.

No references cited.